(12) United States Patent
Szczepanik et al.

(10) Patent No.: US 10,509,723 B1
(45) Date of Patent: Dec. 17, 2019

(54) EXPEDITED CACHE DESTAGE FOR POWER INTERRUPTION IN A VIRTUAL STORAGE APPLIANCE

(71) Applicant: International Business Machines Corporation, Armonk, NY (US)

(72) Inventors: Grzegorz P. Szczepanik, Kraków (PL); Lukasz Jakub Palus, Kraków (PL); Sarvesh Patel, Pune (IN); Kushal Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/006,350

(22) Filed: Jun. 12, 2018

(51) Int. Cl.
| | |
|---|---|
| *G06F 12/00* | (2006.01) |
| *G06F 12/0804* | (2016.01) |
| *G06F 13/00* | (2006.01) |
| *G06F 13/28* | (2006.01) |

(52) U.S. Cl.
CPC .. *G06F 12/0804* (2013.01); *G06F 2212/1032* (2013.01)

(58) Field of Classification Search
CPC .............. G06F 12/0804; G06F 2212/1032
See application file for complete search history.

(56) References Cited

U.S. PATENT DOCUMENTS

| | | | |
|---|---|---|---|
| 7,100,080 B2 | 8/2006 | Howe | |
| 7,370,163 B2 | 5/2008 | Yang et al. | |
| 8,930,619 B2 | 1/2015 | Barrell et al. | |
| 8,990,502 B2 | 3/2015 | Koltsidas et al. | |
| 9,524,244 B2 | 12/2016 | Boden et al. | |
| 2005/0071550 A1 | 3/2005 | Lowe et al. | |

(Continued)

FOREIGN PATENT DOCUMENTS

WO WO2007018779 A1 2/2007

OTHER PUBLICATIONS

Anonymous; Dynamic Cache Destage Queue Depth for Optimum Performance; IP.com; Feb. 3, 2014; 8 pgs.

*Primary Examiner* — Mark A Giardino, Jr.
(74) *Attorney, Agent, or Firm* — Garlick & Markison; Timothy W. Markison; Kelly H. Hale

(57) ABSTRACT

A computing device includes an interface configured to interface and communicate with a communication system, a memory that stores operational instructions, and processing circuitry operably coupled to the interface and to the memory that is configured to execute the operational instructions to perform various operations. The computing device determines to de-stage information stored in a cache memory to a nonvolatile memory device. The computing device determines whether the de-stage is based on a power interruption and when the de-stage is not based on a power interruption the computing device updates access counters associated with the information and the target location for the information in the nonvolatile memory, updates a data access tracking module and initiates a data relocation function to transfer the information to the nonvolatile memory device. When the de-stage is based on a power interruption the computing device initiates relocation of the information from the cache memory to the nonvolatile memory without updating the access counters.

20 Claims, 9 Drawing Sheets

(56) References Cited

U.S. PATENT DOCUMENTS

| | | | |
|---|---|---|---|
| 2006/0072369 A1* | 4/2006 | Madter | G06F 12/0804 365/232 |
| 2006/0212651 A1 | 9/2006 | Ashmore | |
| 2008/0183952 A1* | 7/2008 | Rikitake | G06F 11/1076 711/103 |
| 2013/0132667 A1 | 5/2013 | Benhase et al. | |
| 2014/0379988 A1 | 12/2014 | Lyakhovitskiy et al. | |
| 2017/0132154 A1 | 5/2017 | Bakke et al. | |

* cited by examiner

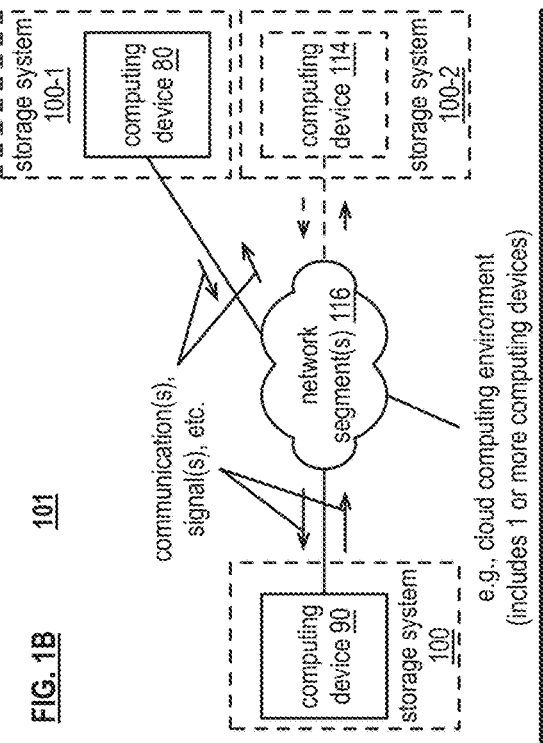
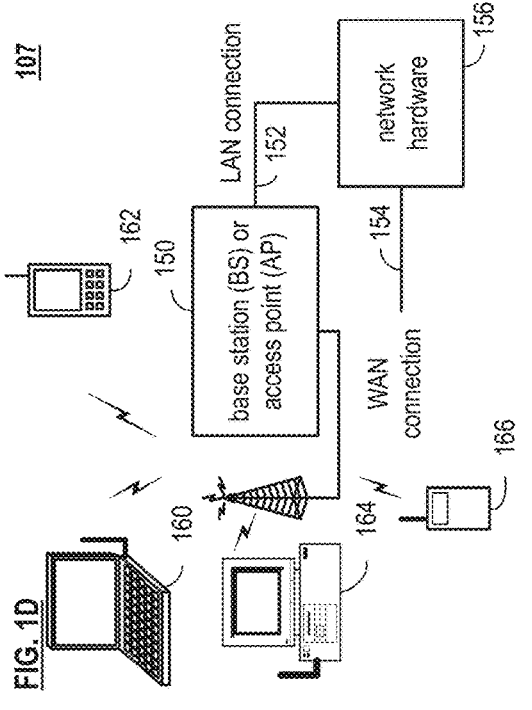
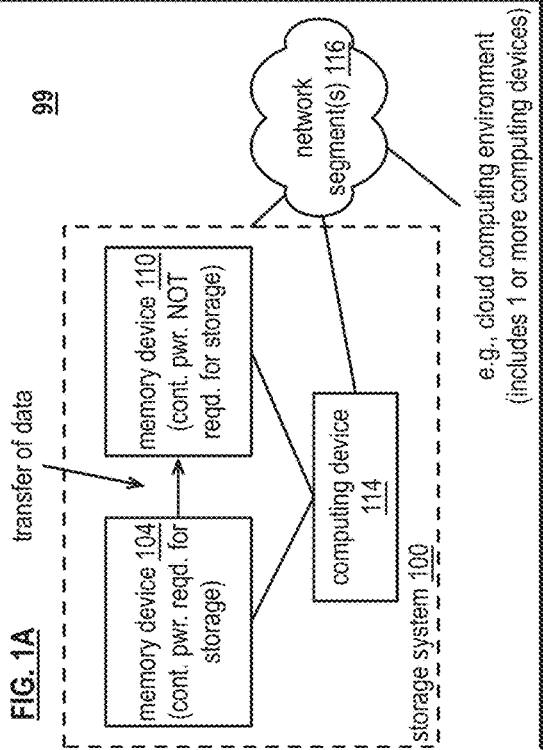
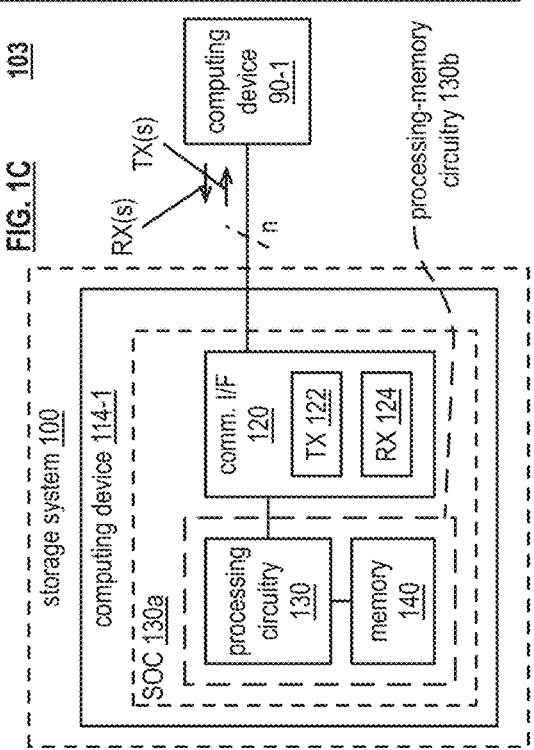

EXPEDITED CACHE DESTAGE FOR POWER INTERRUPTION IN A VIRTUAL STORAGE APPLIANCE

BACKGROUND

This invention relates to virtual storage systems, and more specifically to storage virtualization controllers for multi-tier storage systems with low latency cache and backup power sources.

In certain storage systems multiple logical storage devices of varying capacity and capability are connected to a storage virtualization appliance that is configured to automatically manage the movement of data between the logical storage devices. Storage virtualization appliances have access to high speed, low latency cache memory, so that frequently accessed information in the storage system can benefit from low latency. The low latency cache memory is comprised of volatile memory, which needs backup power to ensure that information contained in the cache memory is not lost in the event of power failure. Backup power sources have limited power, such that once a power failure is detected the contents of the volatile memory cache must be transferred or de-staged to nonvolatile logical storage devices quickly in order to avoid information loss. Backup power limitations can reduce the useable limits of cache memory, since the cache size must be small enough to be de-staged before the backup power depletes, which in turn limits the performance of the overall storage system.

The prior art does not provide adequate means to de-stage data from the volatile memory cache to nonvolatile cache in the event of power failure. Additionally, the prior art fails to provide adequate mechanisms for distinguishing between a de-stage triggered by cache loading and a de-stage triggered by power interruption. Prior art systems also have limited or no signaling between storage system elements, such as the backup power sources and other elements used for managing data movement between logical storage devices.

SUMMARY

Embodiments of the present invention disclose a computer-implemented method, a system, and a computer program product for providing de-staging of volatile cache memory to nonvolatile memory in the event of an external power supply interruption to a multi-tier storage system. Also, embodiments of the present invention disclose a computer-implemented method, a system, and a computer program product for distinguishing between cache de-stage operations based on typical storage tiering operations and de-staging triggered by the status of external power supply, along with signaling mechanisms for communication between storage system elements involved in data relocation and battery backup. In other embodiments de-staging is optimized for speed and/or efficiency using source and target memory data, along with I/O monitoring and system monitoring functions. Other embodiments incorporate cognitive computing to provide insight and history for I/O monitoring and storage device integration.

A storage virtualization controller determines whether to transfer (de-stage) information stored in a nonvolatile memory device to a nonvolatile memory device, and in response to determining to de-stage the information, the computing device determines whether the de-stage based on a power interruption. When the de-stage is not based on a power interruption the storage virtualization controller updates access counters associated with the de-stage operation along with location addresses of the nonvolatile memory device. A data access tracking module is updated, and a data relocation manager is initiated to manage de-stage of the information from the volatile memory device to a nonvolatile device. When the de-stage is based on a power interruption the storage virtualization controller bypasses the access counter updating and the data relocation management to transfer the volatile memory device contents directly to the nonvolatile memory. In some examples the power interruption is determined based on receipt of a signal from the UPS, and in another example the storage virtualization appliance is configured to distinguish between a power interruption triggered de-stage and a non-power interruption triggered de-stage. Additional data relocation functions are also suspended or terminated in other examples related to power interruption.

BRIEF DESCRIPTION OF THE DRAWINGS

FIG. 1A is a diagram illustrating an embodiment of one or more communication storage systems including de-staging according to various embodiments of the present invention;

FIG. 1B is a diagram illustrating an embodiment of one or more communication systems according to various embodiments of the present invention;

FIG. 1C is a diagram illustrating an embodiment of a computing device configured to operate within a storage system according to various embodiments of the present invention;

FIG. 1D is a diagram illustrating an embodiment of a communication system according to various embodiments of the present invention;

DETAILED DESCRIPTION

Figure 2:
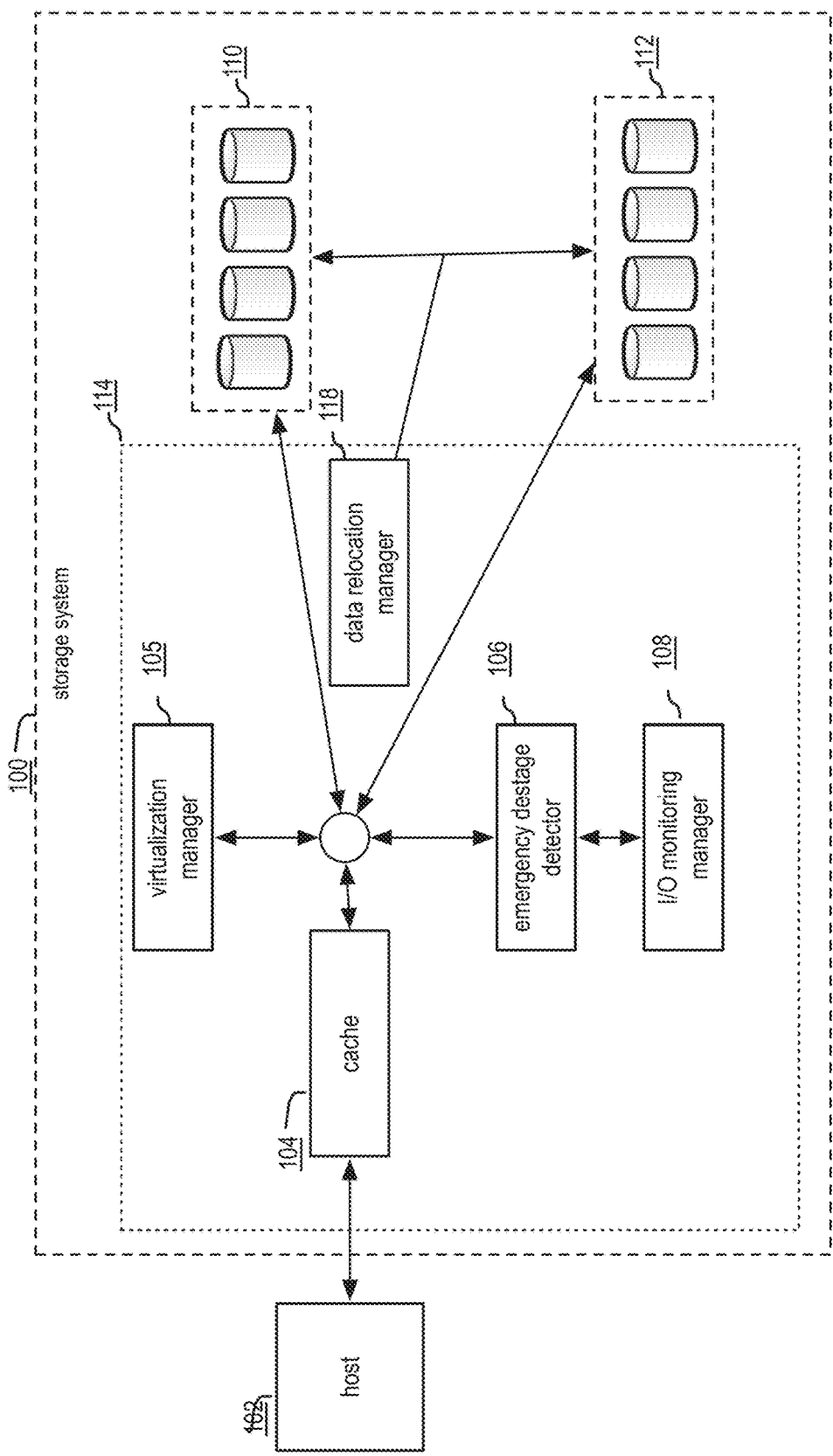
FIG. 2 is a diagram illustrating a storage system including emergency de-staging according to various embodiments of the present invention.

According to an embodiment of the present invention, a novel storage virtualization system operates with battery backup to provide de-staging of volatile cache memory during external power supply failure. This novel storage virtualization system also involves distinguishing between cache de-stage operations based on the status of external power supply. In some examples, non-emergency cache de-stage operations are suspended or eliminated in order to provide increased speed and/or efficiency for other de-stage functions. In an example, de-staging is optimized for speed and/or efficiency using source and target memory data, along with I/O monitoring and other system monitoring functions. Also, in one example of such novel solutions as presented herein, the novel storage virtualization system utilizes programming interfaces to cognitive computing systems to enable tracking historical I/O heat maps and storage device performance that can be used to improve data transfer decisions, including de-staging, in the storage system.

FIG. 1A is a diagram illustrating an embodiment 99 of a storage system 100 including de-staging according to various embodiments of the present invention. One or more computing devices (e.g., computing device 114, 80, etc.) is configured to manage data transfer between one or more volatile memory devices 104 requiring continuous power for data storage, and one or more nonvolatile memory devices 110 where continuous power is not required to maintain data storage. In an example, volatile memory device 104 is cache memory for storage system 100. The one or more network segments 116 may be implemented in accordance with a cloud computing environment 24 such as described with reference to FIG. 7, and one or more network segments 116 may include one or more other computing devices therein (e.g., nodes, routers, gateways, servers, relays, transcoders, etc.) in some examples and/or embodiments.

In an example of operation and implementation, the computing device 114 includes various components to perform various functions, operations, etc. For example, in some examples, the computing device includes an interface configured to interface and communicate with a communication system, memory that stores operational instructions, and processing circuitry operably coupled to the interface and to the memory. In another example computing device 114 is configured to access one or more host computing devices, such as host 102 from FIG. 2, using network segments 116 to transparently manage data transfer across storage system 100 and can include various elements, such as virtualization manager 105, I/O monitoring manager 108 and emergency de-stage detector 106 from FIG. 2.

The computing device 114 is configured to determine whether to transfer at least a portion of information stored in a first memory device 104 to a second memory device 110. Note that the first memory 104 device requires power to maintain first stored information therein, and the second memory device 110 does not require power to maintain second stored information therein. Then, based on a first determination to transfer at least a portion of the first information stored in the first memory device 104 to the second memory device 110, the computing device 114 is configured to determine whether the transfer of at least a portion of the stored information of the first memory device to the second memory device is associated with a power interruption.

Based on a second determination that the transfer of the at least the portion of the first information stored in the first memory device to the second memory device is not associated with the power interruption, the computing device 114 is configured to perform various operations. For example, the computing device is configured to execute a first one or more operations that include updating one or more access counters associated with the transfer of the at least the portion of the first information stored in the first memory device 104 to the second memory device 110. Note that the one or more access counters are associated with one or more location addresses of the second memory device 110. The computing device 114 is also configured to update a data access tracking module, initiate a data relocation manager, and execute a second one or more operations including initiate transfer of the at least the portion of the first information stored in the first memory device 104 to the second memory device 110.

Then, based on a third determination that the transfer of the at least the portion of the first information stored in the first memory device 104 to the second memory device 110 is associated with the power interruption, the computing device 114 is configured to execute the second one or more operations while excluding the first one or more operations. For example, the computing device 114 is configured to execute the second one or more operations and not to execute the first one or more operations.

FIG. 1B is a diagram illustrating an embodiment 101 of one or more communication systems according to various embodiments of the present invention. One or more network segments 116 provide communication inter-connectivity for at least two computing devices 114 and 90 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 90, 80 and 114 may be of a variety of types of devices including stationary devices, mobile devices, portable devices, etc. and may support communications for any of a number of services or service flows including data, telephony, television, Internet, media, synchronization, etc.

In an example of operation and implementation, device 90 includes a communication interface to support communications with one or more of the other devices 80 and 114 In an example, the computing device 90 includes a communication interface configured to interface and communicate with a communication network (e.g., the one or more network segments 116), memory that stores operational instructions, and a processor coupled to the communication interface and to the memory. The processor is configured to execute the operational instructions to perform various functions, operations, etc. Note that the communication supported by the computing device 90 may be bidirectional/to and from the one or more of the other computing devices 80 and 114 or unidirectional (or primarily unidirectional) from the one or more of the other computing devices 80 and 114.

In one example, computing device 90 includes a processor that generates, modulates, encodes, etc. and transmits signals via a communication interface of the computing device 90 and also receives and processes, demodulates, decodes, etc. other signals received via the communication interface of the computing device 90 (e.g., received from other computing devices such as computing device 80, computing device 114, etc.).

FIG. 1C is a diagram illustrating an embodiment 103 of a computing device configured to operate within one or more communication systems according to various embodiments of the present invention. The computing device 114-1 includes a communication interface 120 and processing circuitry 130. Processing circuitry 130 may be configured to communicate with various elements of a storage system, including virtualization manager 105, I/O monitoring manager 108 and emergency de-stage detector 106 from FIG. 2. In another embodiment processing circuitry 130 may include modules capable of performing the functions of virtualization manager 105, I/O monitoring manager 108 and emergency de-stage detector 106 from FIG. 2. The communication interface 120 includes functionality of a transmitter 122 and a receiver 124 to support communications with one or more other devices within a communication system. The computing device 114-1 may also include memory 140 to store information including one or more signals generated by the computing device 114-1 or such information received from other devices (e.g., computing device 112) via one or more communication channels. For example, memory 140 may also include and store various operational instructions for use by the processing circuitry 130 in regard to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 90-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 114-1 is able to support communications with one or more other computing device within one or more communication systems including computing device 90-1.

A computing device 114-1 (e.g., which may be any one of computing devices 114, 90, or 80 as with reference to FIG. 1B) is in communication with another computing device 90-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 114-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 114-1 also includes a processing circuitry 130, and an associated memory 140, to execute various operations including interpreting at least one signal, symbol, packet, and/or frame transmitted to computing device 90-1 and/or received from the computing device 90-1 and/or any other computing device. The computing devices 114-1 and 90-1 may be implemented using at least one integrated circuit in accordance with any desired configuration or combination of components, modules, etc. within at least one integrated circuit. Also, the computing devices 114 and/or 90 may each include one or more antennas for transmitting and/or receiving of at least one packet or frame wirelessly (e.g., computing device 114-1 may include m antennas, and computing device 90-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 114-1 may be implemented in any number of "processing modules," "processing circuits," "processors," and/or "processing units" (e.g., 1, 2, ..., and generally using N such "processing modules," "processing circuits," "processors," and/or "processing units", where N is a positive integer greater than or equal to 1).

In some examples, the computing device 114-1 includes both processing circuitry 130 and communication interface 120 configured to perform various operations. In other examples, the computing device 114-1 includes SOC 130*a* configured to perform various operations. In even other examples, the computing device 114-1 includes processing-memory circuitry 130*b* configured to perform various operations. Generally, such operations include generating, transmitting, etc. signals intended for one or more other computing device (e.g., computing device 90-1) and receiving, processing, etc. other signals received for one or more other devices (e.g., computing device 90-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 114-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

The processing circuitry 130 is configured to execute the operational instructions to perform various functions, operations, and processes (sometimes in cooperation with the communication interface 120 and/or the memory 140).

Note also that the communication interface 120 from FIG. 1C may include functionality to support receipt of user input and output of user output (e.g., via a touchscreen, a keyboard, audio and/or video input/output ports, etc.) to facilitate interaction with one or more users of the computing device 114-1. Such functionality is implemented separately from the communication interface 120 in some examples and is integrated into the communication interface 120 in other examples.

In an example of operation and implementation, the computing device 114-1 includes various components to perform various functions, operations, etc. For example, in some examples, the computing device includes an interface (e.g., communication interface 120) configured to interface and communicate with a communication system, memory 140 that stores operational instructions, and processing circuitry 130 operably coupled to the interface and to the memory.

The processing circuitry 130 is configured to determine whether to transfer at least a portion of information stored in a first memory device to a second memory device. The determination may be based on a number of factors, including memory device being at or near capacity. Note that the first memory device requires power to maintain first stored information therein, and the second memory device does not require power to maintain second stored information therein. Then, based on a first determination to transfer at least a portion of the first information stored in the first memory device to the second memory device, the processing circuitry 130 is configured to determine whether the transfer of at least a portion of the stored information of the first memory device to the second memory device is associated with a power interruption.

Based on a second determination that the transfer of the at least the portion of the first information stored in the first memory device to the second memory device is not associated with the power interruption, the processing circuitry 130 is configured to perform various operations. For example, the computing device is configured to execute a first one or more operations that including to update one or more access counters associated with the transfer of the at least the portion of the first information stored in the first memory device 104 to the second memory device. Note that the one or more access counters are associated with one or more location addresses of the second memory device. The processing circuitry 130 is also configured to update a data access tracking module, initiate a data relocation manager, and execute a second one or more operations including initiate transfer of the at least the portion of the first information stored in the first memory device to the second memory device.

Then, based on a third determination that the transfer of the at least the portion of the first information stored in the first memory device to the second memory device is associated with the power interruption, the processing circuitry 130 is configured to execute the second one or more operations while excluding the first one or more operations. For example, the processing circuitry 130 is configured to execute the second one or more operations and not to execute the first one or more operations.

In other examples, a target location in the second memory is determined based on determining that a contiguous storage area in the second memory is available. In another example computing device 114-1 can receive a signal from an interruptible power supply, as discussed more fully with respect to FIG. 6 below. The signal may indicate that main power has been or is about to be interrupted. In another example, computing device 114-1 is configured to distinguish between a power interruption triggered de-stage and a non-power interruption triggered de-stage based on historical data and/or patterns collected for the storage system, analysis of the power signal received from a main power source and input from the cognitive system of FIG. 6.

FIG. 1D is a diagram illustrating an embodiment 107 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

FIG. 2 is a schematic of a storage system 100 including emergency de-staging. Storage system 100 includes a storage virtualization appliance 114, comprising various functional elements, including virtualization manager 105, I/O monitoring manager 108, emergency de-stage detector 106, and I/O cache 104. The storage virtualization appliance 114 of storage system 100 provides inline virtualization for storage arrays, including access to solid-state memory (SSD) 110, hard disk drive memory (HDD) 112, along with cache 104. The storage virtualization appliance 114 presents itself as a "target" for host device 102 and as a comprehensive host for solid-state memory (SSD) 110 and hard disk drive memory (HDD) 112. Cache 104 is used to store active data that can be accessed quickly and can be comprised of solid-state volatile memory chips, such as dynamic random-access memory (DRAM) or static random-access memory (SRAM) that require power in order to store data. Information accessed by the host 102 frequently can be stored in cache 104 in order to take advantage of the low latency of these relatively high-speed memories.

Storage virtualization appliance 114 provides access to storage devices with different operating criteria, including, but not limited to access speed, security, frequency of use capability, and data recovery proficiency in a multi-tier arrangement. For example, cache 104 provides high access speed, and can accommodate constant access, whereas HDD 112 provides security and low cost, however access speed is constrained by the read channel architecture and other factors, such as the SCSI interface. SSD 110, on the other hand, provides nonvolatile storage like HDD 112 with potentially faster access times using solid state memory devices and message-based commands for data transfer, such as non-volatile memory express (NVMe). HDD 112 can also be instantiated utilizing a variety of drive speeds, such as 5400 RPM, 7200, and 10,000 RPM drives, with increasing cost and performance. Multi-tier storage systems, such as storage system 100 necessarily include at least one tier providing relatively fast access times and one or more tiers with relatively slower access times. Storage devices with faster access times are generally much more "expensive" than slower access time storage devices, accordingly faster, more expensive storage devices are used sparingly, while the slower storage devices are preferred from an expense and efficiency standpoint. Storage virtualization appliance 114 can make use of software or embedded firmware to relocate ("migrate") frequently used data ("hot data") to faster access ("upper tier") storage devices from slower access ("lower tier") storage devices in copy operations operating automatically on storage virtualization appliance 114 (as well as the reverse migration of "cold data" to lower tier storage devices). A such storage virtualization appliance 114 provides for the automated progression or demotion of data across the different tires of storage devices.

Migration across storage device tiers involves the movement of data between the available tiers using WRITE operations to target storage devices, based on the "hotness" and "coldness" of the data. Data movement can make use of areas of contiguous storage reserved for one or more files in a given file system called "extents". A file can consist of zero or more extents where one file fragment requires one extent. Extent movement between storage devices is initiated based on a measurement of hotness of the data involved in an extent and the target storage device is selected based primarily on the hotness of the data.

Figure 3:
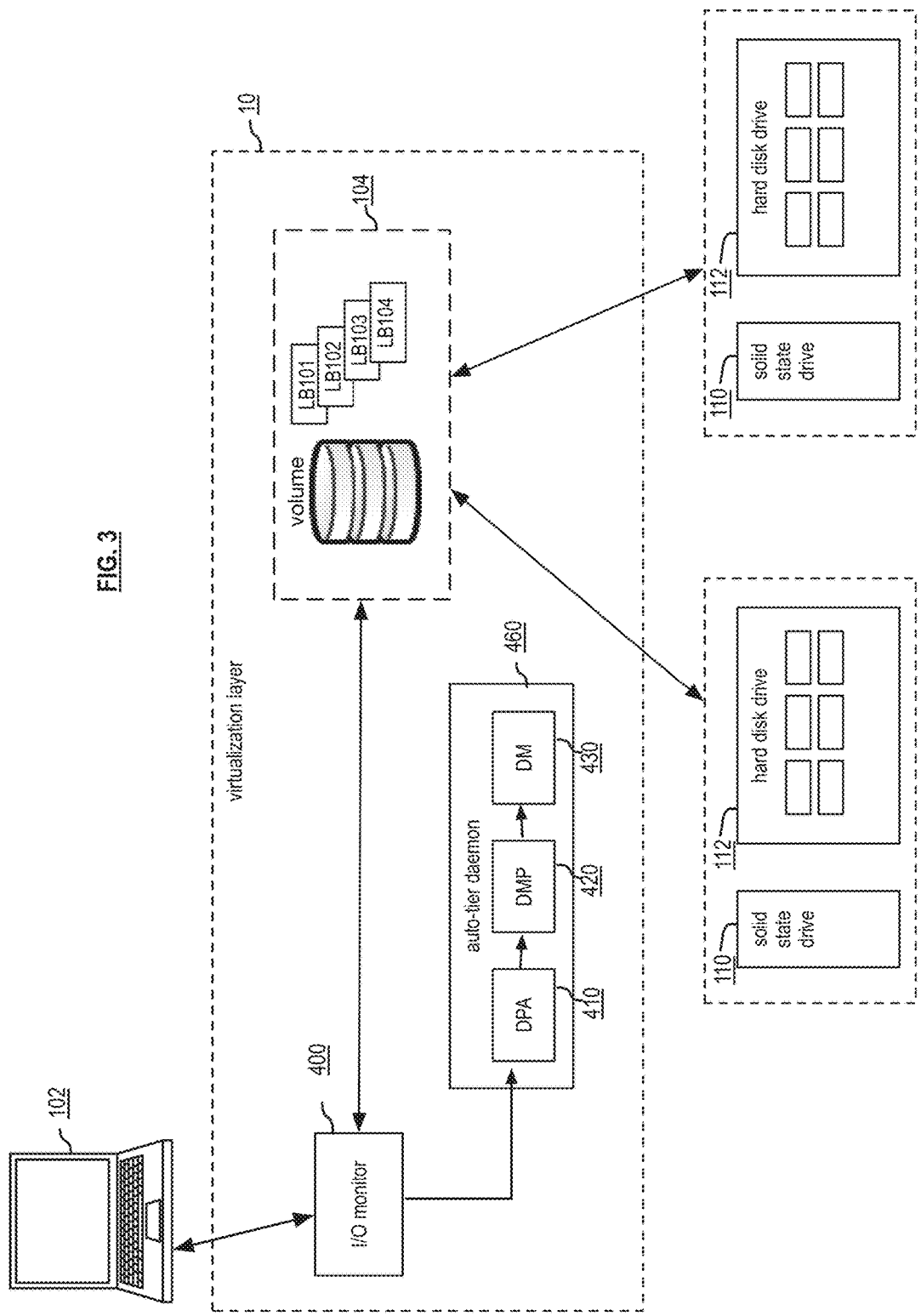
FIG. 3 is a diagram illustrating a multi-tier storage system incorporating a virtualization layer according to various embodiments of the present invention.

FIG. 3 illustrates a multi-tier storage system incorporating a virtualization layer 10 with an I/O monitor 400 monitoring the I/O operations for data in the storage pool. Dedicated counters are maintained for each extent, which are in turn incremented upon reception of I/O traffic from upper layers of the virtualization layer. In an example from FIG. 2, when an I/O request is received from host 102 at a storage tier, (data) monitoring daemon 460 reads the location block address (LBA) for the request source and increments the access counters for the request. The I/O counter update is performed for each I/O operation coming from an upper layer of the storage system, and once system cache data is flushed to persistent storage, such as SDD 10 or HDD 112, the I/O counters for all the data associated with the I/O request is written to the persistent storage. Note that when the system cache is flushed (and before the data associated with the I/O request is written to the persistent storage) the related heat map counters used for the tiering process are updated.

Access patterns "captured" by I/O monitor 400 are used to generate usage statistics that can be transmitted to data placement advisor (DPA) 410, which identifies "hot" data and outputs potential data migrations to the data migration planner (DMP) 420. DMP 420 performs further analysis and provides a recommended data plan based on the physical storage characteristics of the storage pool(s) to data migrator (DM) 430. FIG. 2 further includes a pair of two-tier storage pools (not including the cache) each with SDD 110 and HDD 112, where files LB101-LB104 can be targeted based on the combined function of virtualization layer 10.

Returning to FIG. 2, storage system 100 can include an uninterruptible power supply (UPS) (also known as an uninterruptible power source or battery backup) that can provide auxiliary or emergency power substantially instantaneously in the event of input power interruptions from a primary power source. The emergency power can be stored in batteries, super-capacitors, flywheels, etc. As such, UPSs provide emergency power for limited periods of time, typically just enough time to properly shut down protected equipment, such as storage system 100. In the case of an external power supply failure any data in a write cache of storage system 100 will preferably be de-staged or flushed to persistent storage, such as SDD 110 or HDD 112, before the storage virtualization appliance 114 must shut down.

In normal (nonemergency) operation, when a cache is full the virtualization manager 105 can commence a flushing operation (storing cache data to persistent storage device locations) during which the storage virtualization appliance 114 monitors each I/O request (data read or data write operation), determines I/O locations(s) and updates the access counters of the target extent. For example, if the system cache contains 128 GB of data and a de-stage is triggered, the tiering mechanism of storage virtualization appliance 114 determines each of the relative physical disk addresses for files and/or file fragments in the system cache and updates the heatmap of those locations in a metadata map. This I/O counter incrementing takes time and power during normal operation that can deplete UPS power before data can be safely de-staged to persistent storage devices. Providing successful de-staging during power interruptions can impose practical limits on storage options for system cache, since larger system cache requires more power to de-stage in an emergency. Smaller system cache will in turn limit performance during normal operation.

FIG. 2 includes emergency de-stage detector 106, which can detect an emergency power loss event. Communication between the I/O monitoring manager 108, emergency de-stage detector 106, cache layers and a UPS or battery backup, along with detection of the power loss event can be based on one or more of detecting a change in power quality being received, receiving a signal using an out-of-band protocol, information received in a reserved field of write Command Descriptor Block (CDB) or SCSI Command Descriptor Block (SCSI CDB), message-based commands, or any independent signaling mechanism when appropriate signaling capabilities are in the same layer within the same storage controller. The SCSI Command Descriptor Block (CDB) is a block of information that describes a given command. Each CDB can be a total of 6, 10, 12, or 16 bytes, but later versions of the SCSI standard also allow for variable-length CDBs. The CDB consists of a one-byte operation code followed by some command-specific parameters. The parameters need not be a full byte long, and the parameter length varies from one command to another.

Referring again to FIG. 2, emergency de-stage detector 106 can be implemented as an element of the storage virtualization appliance 114 as shown, or as a functional element of the UPS itself. In most cases some changes will be needed in the UPS to enable it to sense for external power outage and transmit a SIGNAL to a storage controller node, such as storage virtualization appliance 114, to which it is operably connected. In an example, the SIGNAL would be an INTERRUPT driven mechanism in the storage controller enabling the storage virtualization appliance 114 to secure necessary information from the UPS. In another example, emergency de-stage detector 106 detects a power loss event that is signaled to I/O monitoring manager 108, prompting the I/O monitoring manager to bypass at least a portion of the I/O monitoring and analysis functions in storage system 100. I/O monitoring manager 108 can distinguish between normal cache de-stage operations and emergency de-stage operations and can provide additional functions, such as tiering management functions in order to bypass lower priority I/O monitoring functions that would normally be automatically implemented during an automated tiering/de-staging process.

Figure 4:
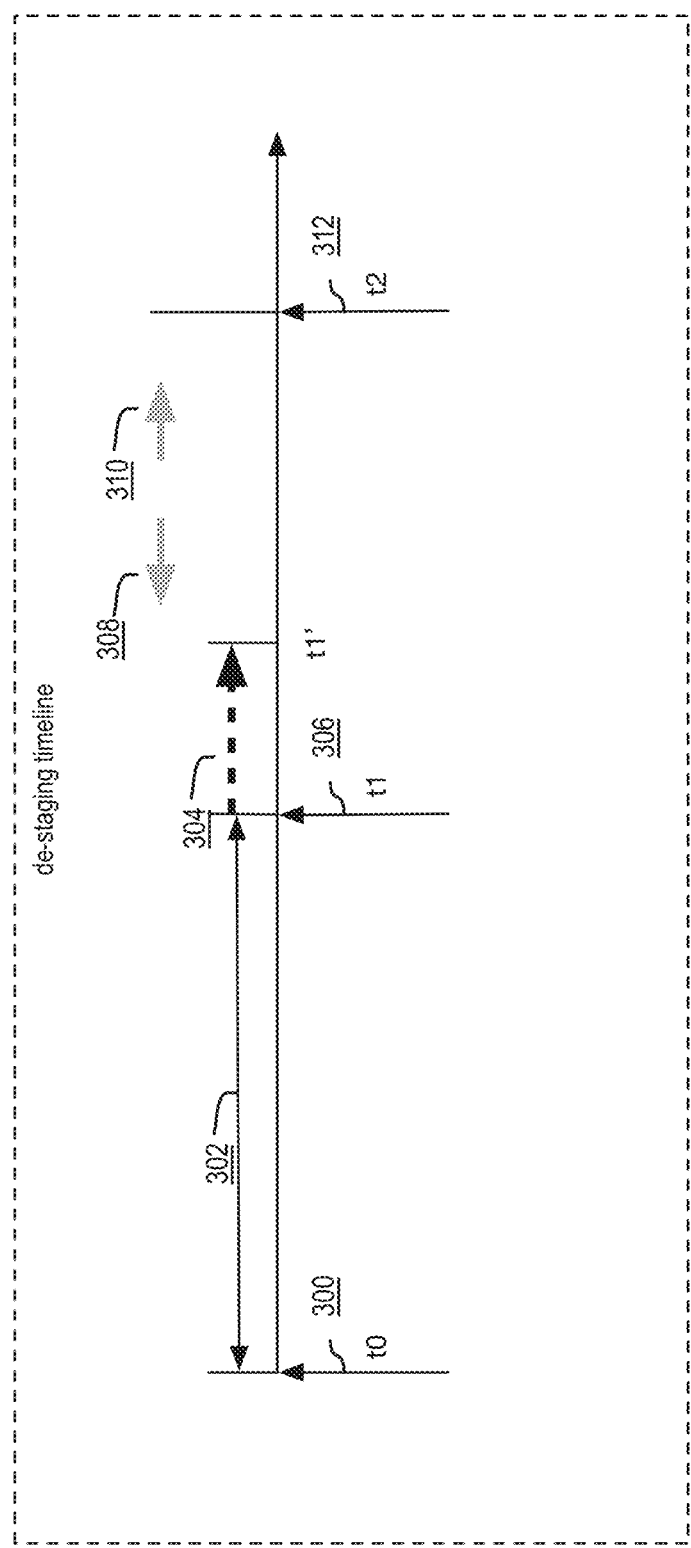
FIG. 4 is a diagram illustrating a timeline for de-staging operations in a multi-tier storage system according to various embodiments of the present invention.

FIG. 4 illustrates a timeline for de-staging operations in a multi-tier storage system, such as storage system 100 from FIG. 2. At time 300 (t0) the system commences monitoring the movement of data in the storage system and collects monitoring data for time period 302 until time 306 (t1). In an example, the system collects monitoring data at time period 302 for a material period of time, such as 24 hours. At time 306 (t1) one or more controllers in the storage system create an initial migration plan for the de-staging operation(s), and data movement is contemporaneously monitored while the initial migration plan is prepared for execution during time period 304. At time 308 (t1') data determined in the initial migration plan to be "cold" is migrated according to the initial migration plan at 308 to one or more lower tiers, while data determined in the initial migration plan to be hot is actively migrated at 310 to one or more higher (faster) tiers. At time 312 (t2) an updated migration plan is created to accommodate changes in data movement collected during the time between t1 and t2. In an example, the one or more controllers in the storage system update the initial migration plan, while in another example the update migration is created without reference to the initial migration plan.

In an example, the timeline from FIG. 4 is altered in response to a power interruption, such as a power interruption detected by emergency de-stage detector 106 from FIG. 2. In this example the de-staging operations in the storage system are altered to accelerate and/or eliminate some or all of the monitoring functions from the timeline in FIG. 3, enabling the storage system to write system cache data to one or more lower tier storage devices immediately. In an example, the storage system suspends one or more of data migration executing based on a migration plan, monitoring of data migration, and creation of updated migration plans in order to execute a flush of the system cache to one or more lower tier storage devices.

Time period 302, as well as the time period between time 306 (t1) and 312 (t2) may be any reasonable period of time that will allow desirable de-stage operations while minimizing hysteresis effects that may cause inefficiently movement of data back and forth between tiers.

Figure 5:
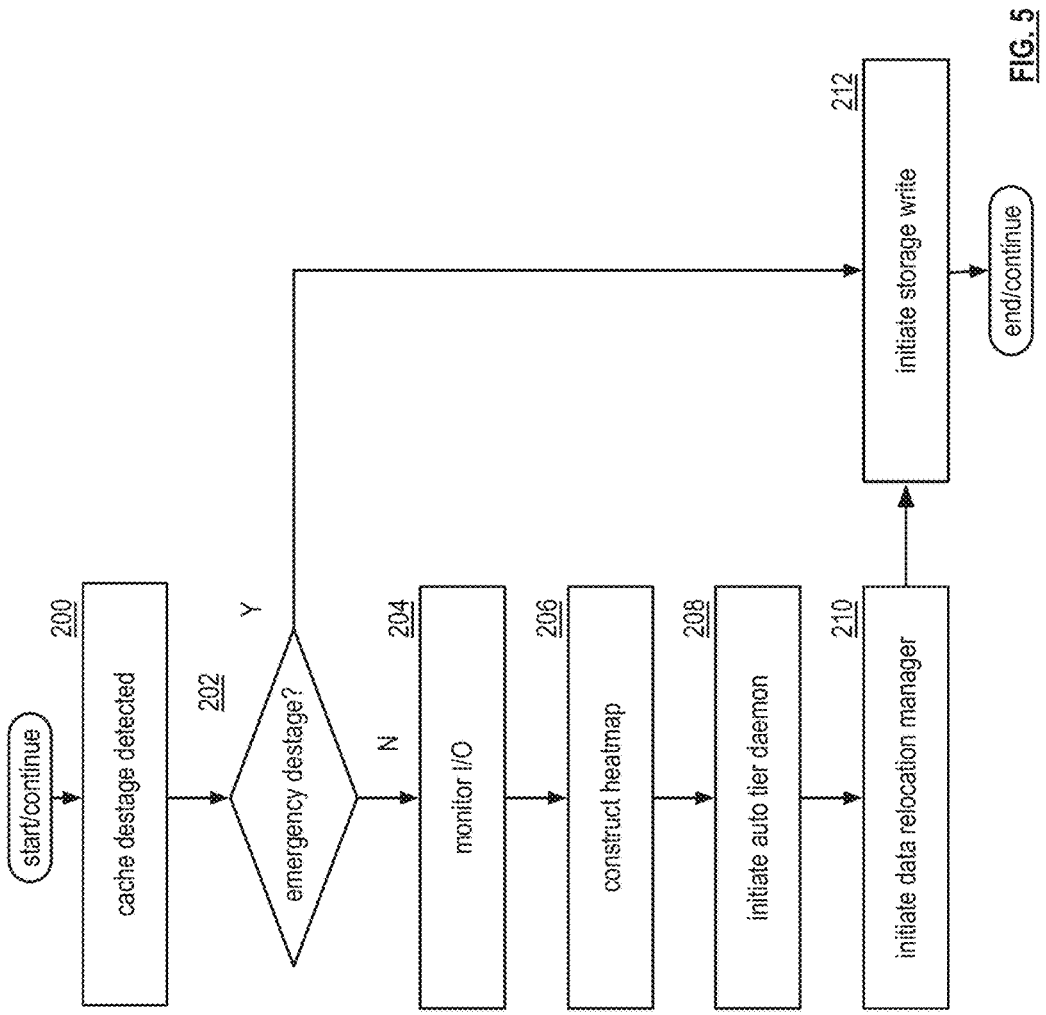
FIG. 5 is a logic diagram of a method for executing a cache de-stage operation with and without detection of a power interruption according to various embodiments of the present invention.

FIG. 5 is an example logic diagram of a method for executing a cache de-stage operation with and without detection of a power interruption. The method begins at step 200 a cache de-stage is detected by, for example, the emergency de-stage detector 106 of FIG. 2. Cache-stage detection 200 can be driven by an indication that the system cache is at or nearing capacity, or by another indication by the storage system that cache de-stage is warranted. In the event of an emergency power interruption (emergency), cache-stage detection 200 can be driven by receipt of a signal from a UPS device indicating that external power has been interrupted, or by detection of some other event that indicates immediate or imminent main power failure.

The method continues at step 202 where one or more modules, such as the emergency de-stage detector 106 of FIG. 2, determines whether the cache de-stage is a "normal", or non-emergency de-stage, and when a non-emergency cache de-stage is detected, the method continues with the I/O monitor collecting data migration data at step 204 until sufficient data is collected to create a migration plan for the cache de-stage, including creation of a heatmap at step 206 for the collected data movement. The method continues with the storage system initiating execution of an auto tiering function, such as auto-tier daemon 460 of FIG. 3 and then continues with the storage system initiating a data relocation manager, such as data relocation manager 118 of FIG. 2, to execute migration of data in system cache to a lower tier of the storage system by initiating storage WRITE of system cache data to non-volatile memory, such as such as SDD 110 or HDD 112 of FIG. 1.

When the one or more modules determine at step 202 that the cache de-stage is based on the detection of a main power interruption (i.e. is not a "normal" cache de-stage) the method continues with one or more modules of the storage system initiating storage WRITE of system cache data to non-volatile memory without one or more of steps 204, 206, 208 and/or step 210. In an example, one or more of steps 204, 206, 208 and 210 are suspended and the current heatmap (the heatmap available at the time of the emergency de-stage) is stored in non-volatile memory along with system cache data.

Figure 6:
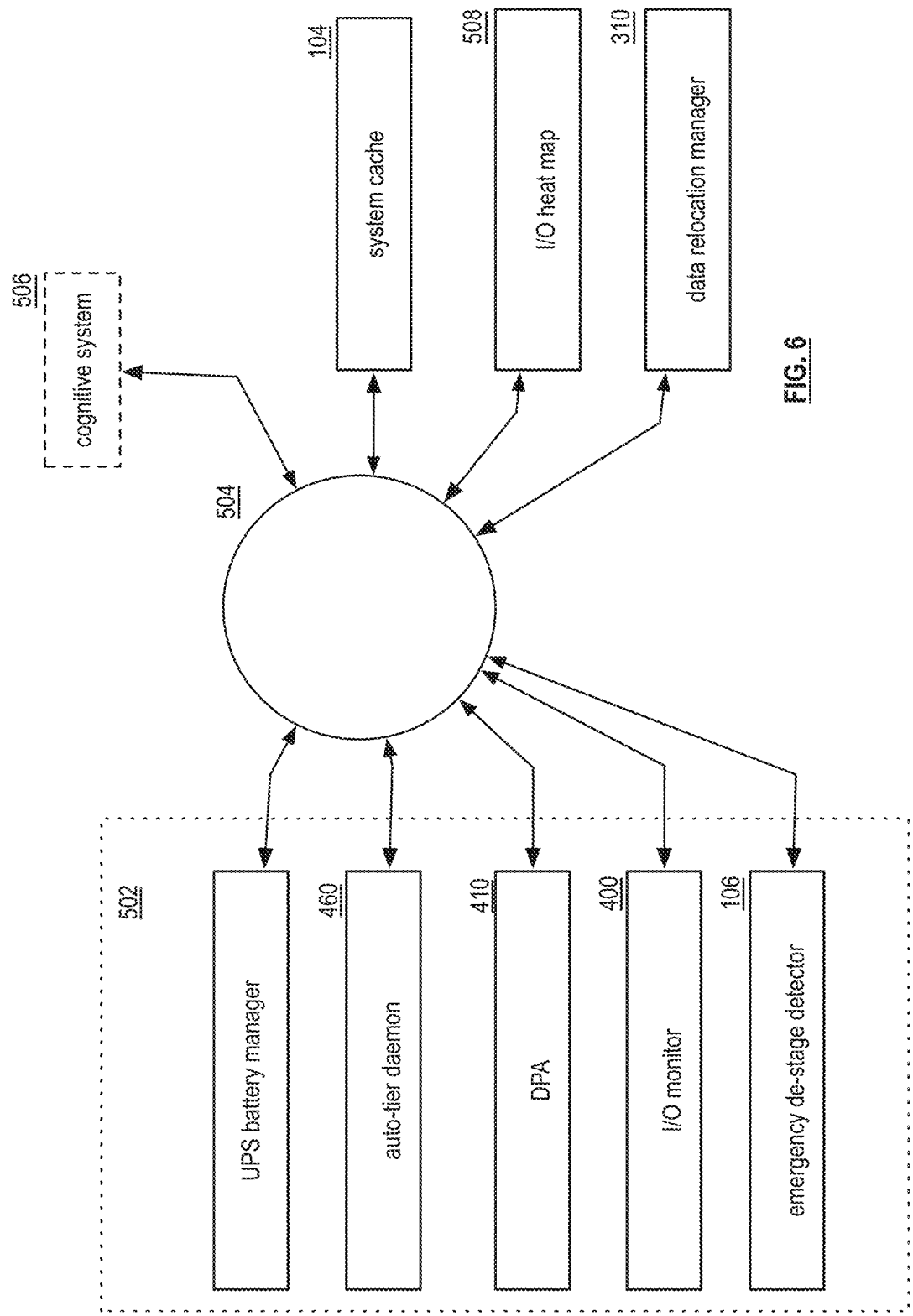
FIG. 6 is a diagram illustrating the connection of application programming interfaces for I/O monitoring and data relocation operations according to various embodiments of the present invention.

In an example, in order to optimize de-staging execution when an emergency de-stage is detected in step 202, one or modules in the storage system can detect the write cache available for de-staging and select available extents dynamically. FIG. 6 is a diagram illustrating the connection of application programming interfaces (APIs) 502 for I/O monitoring and data relocation operations. APIs 502 include interfaces for various elements useful for developing data migration plans, including elements both inside and outside a storage virtualization appliance (see, for example, storage virtualization appliance 114 of FIG. 1). APIs can be in-band or out-of-band and can be connected through interface 504, allowing the APIs to be integrated for storage virtualization appliance functions. Example APIs include but are not limited to one or more battery managers for UPS functions, auto-tier daemon 460, data placement advisor (DPA) 410, I/O monitor 400 and emergency de-stage detector 106. The various APIs allow communication between the various elements for control of the cache de-stage and other data relocation functions using interface 504.

Cognitive system 506 can also be integrated for use with the storage system using one or more APIs. In an example, one or more cognitive system APIs can be used to collect heat map and heat relocation data in order to develop historical and pattern-based knowledge for the storage system. Cognitive systems (sometimes called cognitive computing systems), such as cognitive system 506, use machine learning to enable users and computing systems to interact, so as to extend human expertise and cognition across knowledge domains. Using cognitive systems, users can make complex decisions involving large volumes of dynamically changing data. Cognitive systems, as used herein, are a category of artificial intelligence technology that incorporate machine learning, reasoning, natural language processing, speech recognition and vision (object recognition), human-computer interaction, dialog and narrative generation, among other things to improve (and automate) human decision making. Examples of cognitive systems include the IBM Corporation Watson™ question-answering computer system, which is capable of answering questions posed in natural language.

Cognitive system 506 can be used, for example, to analyze historical data from I/O heat map 508 and data from data relocation manager 310, along with performance attributes for the system cache non-volatile memory devices and the performance of main and backup power sources. Using insight provided by cognitive system 506 the storage virtualization appliance can, for example, provide information to enable the improvement of data relocation operations over time, provide for more efficient normal and emergency cache de-stage operations, and provide guidance relating to the health of memory devices accessed by the storage virtualization device.

Figure 7:
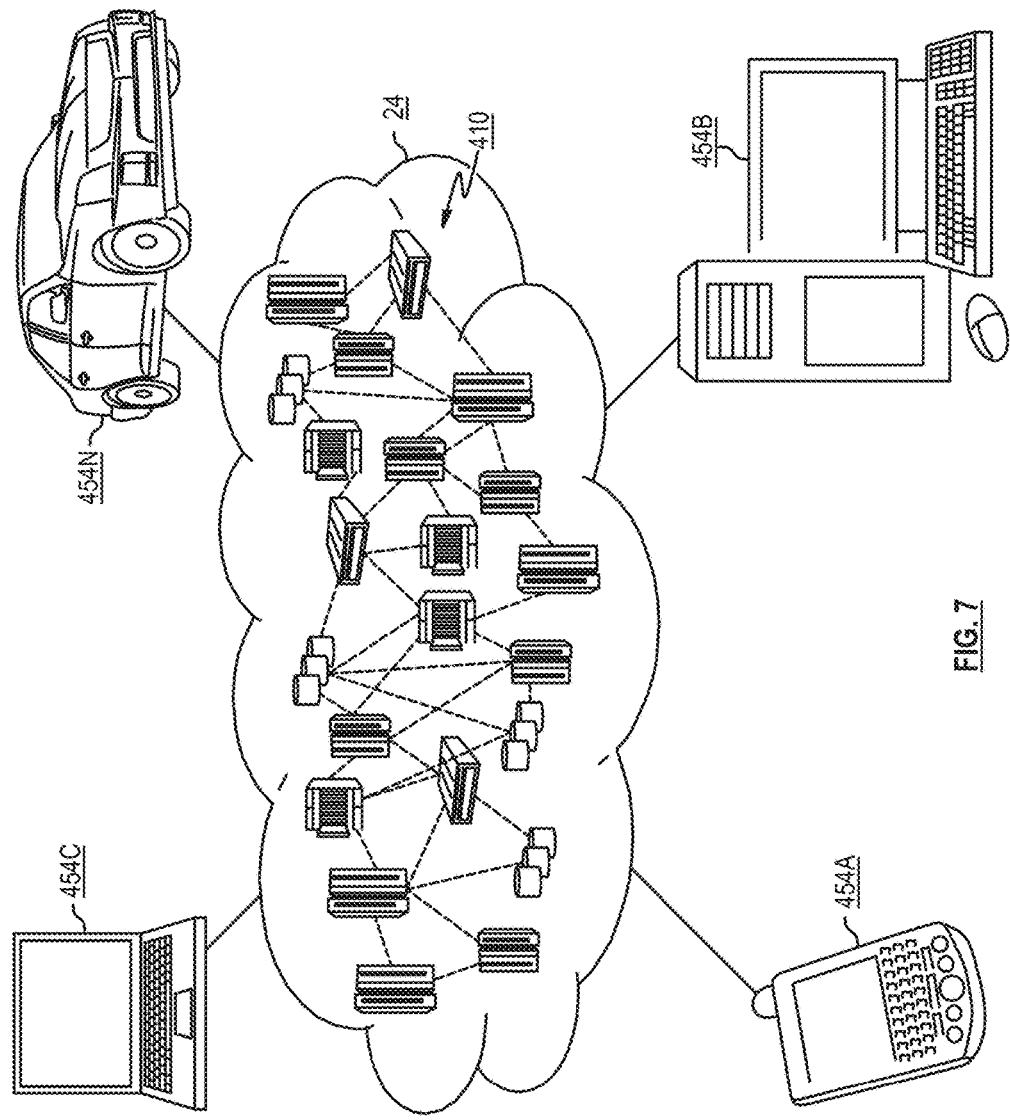
FIG. 7 depicts a cloud computing environment according to various embodiments of the present invention.

FIG. 7 depicts a cloud computing environment 2100 according to various embodiments of the present invention. FIG. 7 presents an illustrative cloud computing environment 24. As shown, cloud computing environment 24 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 24 to offer infrastructure, platforms and/or software as services for which a cloud consumer does not need to maintain resources on a local computing device. It is understood that the types of computing devices 454A-N shown in FIG. 7 are intended to be illustrative only and that computing nodes 410 and cloud computing environment 24 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
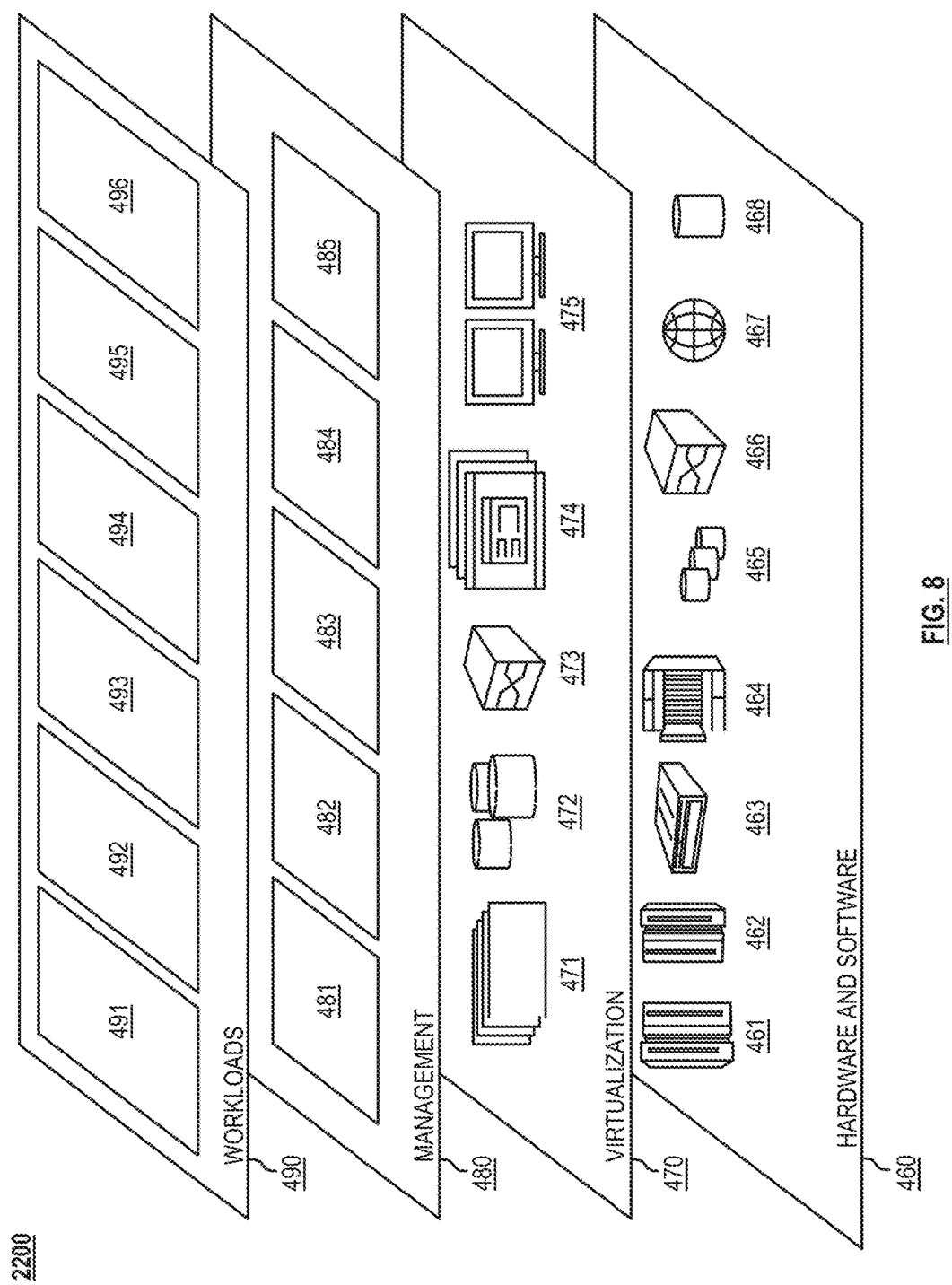
FIG. 8 depicts abstraction model layers according to various embodiments of the present invention.

FIG. 8 depicts abstraction model layers 2200 according to various embodiments of the present invention. Referring now to FIG. 8, a set of functional abstraction layers provided by cloud computing environment 24 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture-based servers 462; servers 463; blade servers 464; storage devices 465; and networks and networking components 466. In some embodiments, software components include network application server software 467 and database software 468. In some embodiments, one or more hardware components can be implemented by utilizing the computing device 1301 of FIG. 9.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and cache destaging 496.

Figure 9:
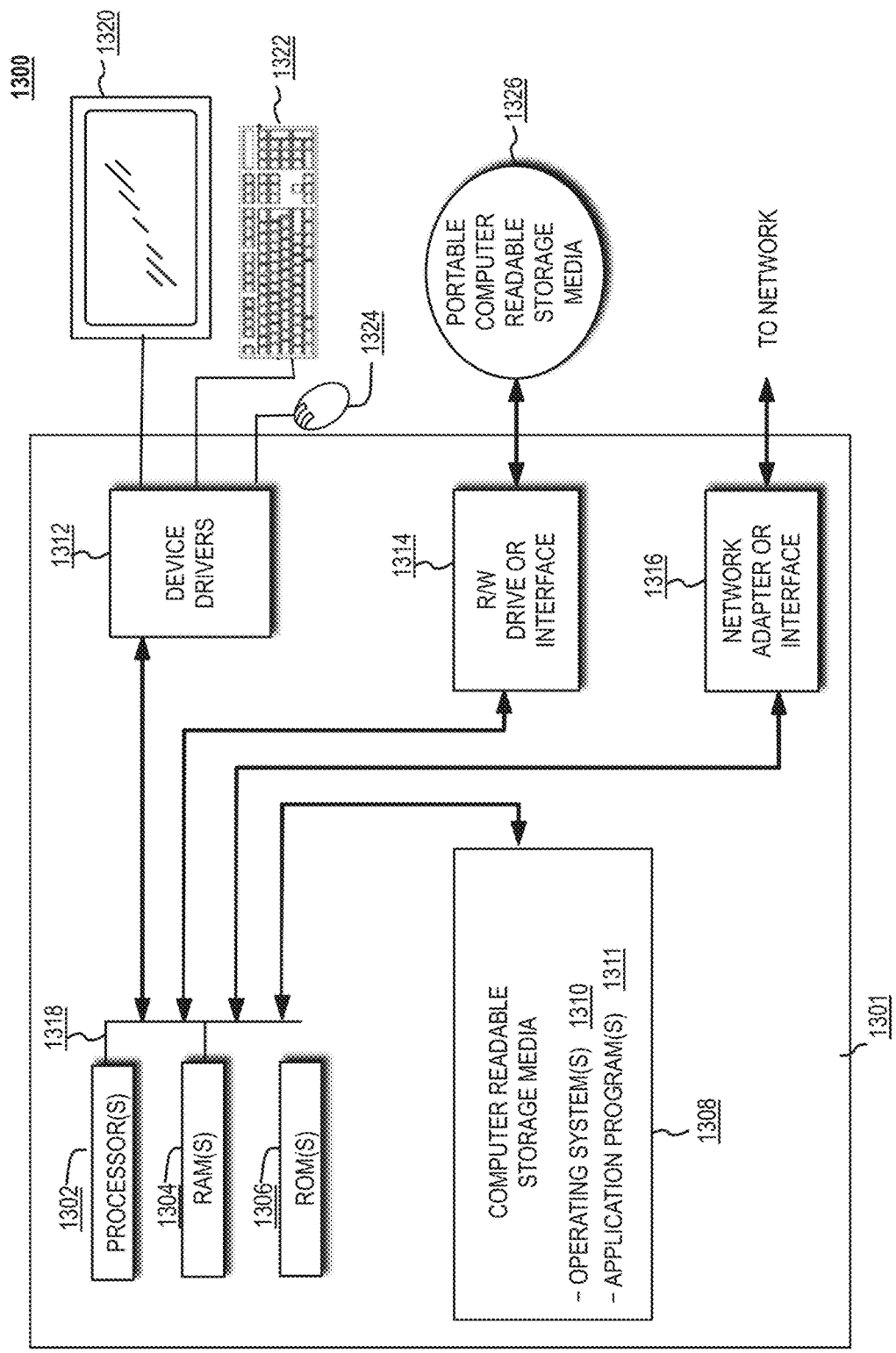
FIG. 9 depicts a block diagram of a computing device according to various embodiments of the present invention.

FIG. 9 depicts a block diagram 1300 of a computing device according to various embodiments of the present invention. FIG. 9 depicts a block diagram of components of a computing device 1301, which can be utilized to implement some or all of the cloud computing nodes 410, some or all of the computing devices 454A-N of FIG. 8, and/or to implement other computing devices described herein in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 1301 can include one or more processors 1302, one or more computer-readable RAMs 1304, one or more computer-readable ROMs 1306, one or more computer readable storage media 1308, device drivers 1312, read/write drive or interface 1314, and network adapter or interface 1316, all interconnected over a communications fabric 1318. Communications fabric 1318 can be implemented with any architecture designed for passing data and/or control information between processors (such as microprocessors, communications and network processors, etc.), system memory, peripheral devices, and any other hardware components within the system.

One or more operating systems 1310 and/or application programs 1311, such as network application server software 467 and database software 468 of FIG. 7, are stored on one or more of the computer readable storage media 1308 for execution by one or more of the processors 1302 via one or more of the respective RAMs 1304 (which typically include cache memory). In the illustrated embodiment, each of the computer readable storage media 1308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 1301 can also include a R/W drive or interface 1314 to read from and write to one or more portable computer readable storage media 1326. Application programs 1311 on computing devices 1301 can be stored on one or more of the portable computer readable storage media 1326, read via the respective R/W drive or interface 1314 and loaded into the respective computer readable storage media 1308.

Computing device 1301 can also include a network adapter or interface 1316, such as a TCP/IP adapter card or wireless communication adapter. Application programs 1311 on computing devices 454A-N can be downloaded to the computing device from an external computer or external storage device via a network (for example, the Internet, a local area network or other wide area networks or wireless networks) and network adapter or interface 1316. From the network adapter or interface 1316, the programs may be loaded into the computer readable storage media 1308. The network may comprise copper wires, optical fibers, wireless transmission, routers, firewalls, switches, gateway computers and edge servers.

Computing device 1301 can also include a display screen 1320, a keyboard or keypad 1322, and a computer mouse or touchpad 1324. Device drivers 1312 interface to display screen 1320 for imaging, to keyboard or keypad 1322, to computer mouse or touchpad 1324, and/or to display screen 1320 for pressure sensing of alphanumeric character entry and user selections. The device drivers 1312, R/W drive or interface 1314, and network adapter or interface 1316 can comprise hardware and software stored in computer readable storage media 1308 and/or ROM 1306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    an interface configured to interface and communicate with a communication system;
    memory that stores operational instructions; and
    processing circuitry operably coupled to the interface and to the memory, wherein the processing circuitry is configured to execute the operational instructions to:
       determine whether to transfer at least a portion of information stored in a first memory device to a second memory device, wherein the first memory device requires power to maintain first stored information therein, and wherein the second memory device does not require power to maintain second stored information therein;
       based on a first determination to transfer at least a portion of the first information stored in the first memory device to the second memory device, determine whether the transfer of at least a portion of the stored information of the first memory device to the second memory device is associated with a power interruption;
       based on a second determination that the transfer of the at least the portion of the first information stored in the first memory device to the second memory device is not associated with the power interruption:
          execute a first one or more operations including:
             update one or more access counters associated with the transfer of the at least the portion of the first information stored in the first memory device to the second memory device, wherein the one or more access counters are associated with one or more location addresses of the second memory device;
             update a data access tracking module; and
             initiate a data relocation manager; and
          execute a second one or more operations including initiate transfer of the at least the portion of the first information stored in the first memory device to the second memory device; and
       based on a third determination that the transfer of the at least the portion of the first information stored in the first memory device to the second memory device is associated with the power interruption,
          execute the second one or more operations while excluding the first one or more operations.

2. The computing device of claim 1, wherein the processing circuitry is further configured to execute the operational instructions to:
    based on a third determination that the transfer of the at least the portion of the first information stored in the first memory device to the second memory device is associated with the power interruption, further determine a target location for the stored information in the second memory based on a determination that a contiguous storage area of the second memory is available.

3. The computing device of claim 1, wherein the first determination to transfer at least a portion of the first information stored in the first memory device to the second memory device is based on the first memory device being substantially full.

4. The computing device of claim 1, wherein the third determination that the transfer of the at least the portion of the first information stored in the first memory device to the second memory device is associated with the power interruption is further based on the computing device receiving a signal from an uninterruptible power supply, and further wherein the signal is sufficient to determine that a main power has been interrupted.

5. The computing device of claim 1, wherein the processing circuitry is further configured to execute the operational instructions to:
    based on a second determination that the transfer of the at least the portion of the first information stored in the first memory device to the second memory device is not associated with the power interruption, further initiate an auto-tiering program, where the auto-tiering program includes at least one of a data placement advisor function, a data migration planning function and a data migrator function.

6. The computing device of claim 5, wherein the second memory device is a solid-state memory.

7. The computing device of claim 1, wherein the first determination to transfer at least a portion of the first information stored in the first memory device to the second memory device is based on the computing device receiving a favorable indication that a de-stage of the first memory device is imminent and further wherein the computing device is configured to distinguish between a power interruption triggered de-stage and a non-power interruption triggered de-stage.

8. The computing device of claim 1, wherein the processing circuitry is further configured to execute the operational instructions to:

based on a third determination that the transfer of the at least the portion of the first information stored in the first memory device to the second memory device is associated with the power interruption, suspend pending data relocation between the second memory device and a third memory device, wherein the third memory device is a hard-drive memory or a slower solid-state memory.

9. A storage system comprising:
an interface configured to interface and communicate with a communication system;
memory that stores operational instructions; and
processing circuitry operably coupled to the interface and to the memory, wherein the processing circuitry is configured to execute the operational instructions to:
monitor each input/output (I/O) operation of a set of I/O operations received by the storage system, wherein each I/O operation of the set of I/O operations includes information sufficient to determine a memory location of a set of memory locations associated with each I/O operation of the set of I/O operations;
increment an access counter for each I/O operation of the set of I/O operations;
based on the access counters associated with each I/O operation of the set of I/O operations, update an I/O monitoring manager, wherein the update includes a frequency of access for each I/O operation of the set of I/O operations;
determine, by the I/O monitoring manager, a memory location of a set of memory locations for information associated with each I/O operation of the set of I/O operations, wherein the memory location is based at least partially on the frequency of access for each I/O operation;
determine, by the storage system, whether a power interruption has occurred, wherein the power interruption is related to a main power source and further wherein an uninterruptible power supply (UPS) is connected to the storage system; and
in response to determining that a power interruption has occurred, bypass the incrementing of the access counters and write at least a portion of any information in volatile memory to nonvolatile memory.

10. The storage system of claim 9, wherein the determining, by the storage system, that a power interruption has occurred is based on the computing device receiving a signal from the UPS, and further wherein the signal is sufficient to determine that power from a main power source has been interrupted.

11. The storage system of claim 9, wherein the determining, by the storage system, that a power interruption has occurred is based on the computing device receiving information sufficient to determine that de-stage of the volatile memory is imminent and further wherein the computing device is configured to distinguish between a power interruption triggered de-stage and a non-power interruption triggered de-stage.

12. The storage system of claim 9, wherein the processing circuitry is further configured to execute the operational instructions to:
in response to determining that a power interruption has occurred, suspend pending data relocation between a first nonvolatile memory device and a second nonvolatile memory device, wherein the second memory device is a hard-drive memory or a slower solid-state memory.

13. The storage system of claim 9, wherein the nonvolatile memory device is a solid-state memory.

14. A method for execution by a storage virtualization appliance, the method comprising:
determining whether to transfer at least a portion of information stored in a first memory device to a second memory device, wherein the first memory device requires power to maintain first stored information therein, and wherein the second memory device does not require power to maintain second stored information therein;
in response to determining to transfer at least a portion of the first information stored in the first memory device to the second memory device, determining whether the transfer of at least a portion of the stored information of the first memory device to the second memory device is associated with a power interruption;
in response to determining that the transfer of the at least the portion of the first information stored in the first memory device to the second memory device is not associated with the power interruption:
executing a first one or more operations including:
updating one or more access counters associated with the transfer of the at least the portion of the first information stored in the first memory device to the second memory device, wherein the one or more access counters are associated with one or more location addresses of the second memory device;
updating a data access tracking module; and
initiating a data relocation manager; and
executing a second one or more operations including initiate transfer of the at least the portion of the first information stored in the first memory device to the second memory device; and
in response to determining that the transfer of the at least the portion of the first information stored in the first memory device to the second memory device is associated with the power interruption,
executing the second one or more operations while excluding the first one or more operations.

15. The method of claim 14 further comprising:
in response to determining that the transfer of the at least the portion of the first information stored in the first memory device to the second memory device is associated with the power interruption, further determining a target location for the stored information in the second memory based on determining that a contiguous storage area of the second memory is available.

16. The method of claim 14, wherein the determining to transfer at least a portion of the first information stored in the first memory device to the second memory device is based on the first memory device being substantially full.

17. The method of claim 14, wherein the determining that the transfer of the at least the portion of the first information stored in the first memory device to the second memory device is associated with the power interruption is further based on the computing device receiving a signal from an uninterruptible power supply, and further wherein the signal is sufficient to determine that a main power has been interrupted.

18. The method of claim 14, further comprising:
in response to determining that the transfer of the at least the portion of the first information stored in the first memory device to the second memory device is not associated with the power interruption, further initiate an auto-tiering program, where the auto-tiering program includes at least one of a data placement advisor function, a data migration planning function and a data migrator function.

19. The method of claim 14, wherein the determining whether to transfer at least a portion of the first information stored in the first memory device to the second memory device is based on the computing device receiving a favorable indication that a de-stage of the first memory device is imminent and further wherein the computing device is configured to distinguish between a power interruption triggered de-stage and a non-power interruption triggered de-stage.

20. The method of claim 14, further comprising:
in response to determining that the transfer of the at least the portion of the first information stored in the first memory device to the second memory device is associated with the power interruption, suspend pending data relocation between the second memory device and a third memory device, wherein the third memory device is a hard-drive memory or a slower solid-state memory.

* * * * *